US012403066B2

(12) United States Patent
Nover et al.

(10) Patent No.: US 12,403,066 B2
(45) Date of Patent: Sep. 2, 2025

(54) DEVICE AND METHOD FOR DEFLECTING AND FOCUSING SHOCK WAVES BY A REFLECTION SURFACES WITH A FOCAL POINT DIFFERENT THAN A PROJECTILE OF A THRUST DIRECTION OF AN APPLICATOR

(71) Applicant: LiKAMED GmbH, Eppingen (DE)

(72) Inventors: Konrad Nover, Eppingen (DE); Felix Dieffenbacher, Eppingen (DE); Peter Vallon, Eppingen (DE)

(73) Assignee: LiKAMED GmbH, Eppingen (DE)

( * ) Notice: Subject to any disclaimer, the term of this patent is extended or adjusted under 35 U.S.C. 154(b) by 0 days.

(21) Appl. No.: 18/642,853

(22) Filed: Apr. 23, 2024

(65) Prior Publication Data

US 2024/0366467 A1 Nov. 7, 2024

(30) Foreign Application Priority Data

May 3, 2023 (DE) ......................... 102023111367.4
Apr. 8, 2024 (DE) ......................... 102024109730.2

(51) Int. Cl.
*A61H 23/00* (2006.01)

(52) U.S. Cl.
CPC ... *A61H 23/008* (2013.01); *A61H 2201/0107* (2013.01); *A61H 2201/1238* (2013.01); *A61H 2201/5058* (2013.01); *A61H 2230/105* (2013.01)

(58) Field of Classification Search
CPC .......... A61H 23/008; A61H 2201/0107; A61H 2201/1238; A61H 2201/5058; A61H 2230/105
See application file for complete search history.

(56) References Cited

U.S. PATENT DOCUMENTS

2006/0293708 A1* 12/2006 Voss ........................ G10K 15/06 606/201
2011/0295160 A1* 12/2011 Hart ..................... A61H 23/008 601/2

FOREIGN PATENT DOCUMENTS

| | | | |
|---|---|---|---|
| CN | 104055545 A * | 9/2014 | ....... A61B 17/22012 |
| EP | 4039202 B1 | 1/2023 | |
| KR | 20230099728 A * | 7/2023 | |

OTHER PUBLICATIONS

Farr, S. et al., Knee Surgery, Sports Traumatology, Arthroscopy 2011, 19 12.

(Continued)

*Primary Examiner* — Serkan Akar
(74) *Attorney, Agent, or Firm* — Michael Soderman

(57) ABSTRACT

A device (1) for deflecting and focusing shock waves, a utilisation of a device (1) for deflecting and focusing shock waves, and a method of focusing and deflecting a shock wave are proposed, wherein the device (1) comprises at least one applicator (2), with at least one applicator (2) having at least one application surface (8) and a shock wave being capable of being emitted from at least one application surface (8) in a thrust direction, and at least one reflector (3), with at least one reflector (3) having at least one reflection surface (9) and a focal point (11) on which shock waves may be focused by the reflection surfaces (9), with the focal point (11) not being located in a thrust direction, whereby the primary shock wave may, in particular, be prevented from impinging on the tissue to be treated.

11 Claims, 1 Drawing Sheet

(56) References Cited

OTHER PUBLICATIONS

Abo Al-Khair, M. A. et al., The Physician and Sportsmedicine 2021, 49, 4.
Berbrayer, D. et al., PM&R 2014, 6 2.
Pisani, E. et al., ,,Effec¬tiveness and tolerability of focal versus radial extracorporeal shock wave. Beyond Rheumatology 2020, Mar. 2020.
Gezginaslan, Ö. et al., Archives of Rheumatology 2Q20, 35, 1; Min Ji, H. et al., Annals of Rehabilitation Medicine 2012, 36, 5.
Treede, R. D. et al., Neurophysiologie Clinique/Clinical Neurophysiology 2QQ3, 33, 6.
Lorenz, J., Zeitschrift für Rheumatologie 1998, 57, 2, und Lorenz, J. Pain Forum 1998, 7, 212.
Domnick, C. et al., Journal of pain research 2009, 2, 49.
Gerdesmeyer, L. M. et al., Der Orthopäde 2002, 31, 7.
Ueberle, F. Einsatz von Stoßwellen in der Medizin. Medizintechnik: Verfahren-Systeme-Informationsverarbeitung, 2017.
Wess, O., Journal für Mineralstoffwechsel 2004, 11, 4.
Crevenna, R. et al., Current Physical Medicine and Rehabilitation Reports 2021, 9.
Rassweiler, J. et al., Extrakorporale Stoßwellentherapie der Urolithiasis. SLK-Kliniken Heil-bronn GmbH, Urologie, Heilbronn, Germany.
Löfken, J.O., Akustische Linse aus ungewöhnlichem Material. Sep. 15, 2021., www.weltderphysik.de, Abruf: Mar. 5, 2024.
Wright, A. et al., Temporal summation of paln from skin, muscle and joint following nocic 2002.
Wright, A. et al., Pain 1993, 52, 2; ab Ithel Davies, I. et al., Pain 1996, 67, 1.
Legon, W. et al., PloS one 2012, 7, 12.
Xu, L. et al., Measurement of Focused Ultrasound Neural Stimulation; Somatosensory Evoked Poten-tial at Two Se¬parate Skin Temperatures IEEE International Ultrasonics Symposium (IUS) 2018.

* cited by examiner

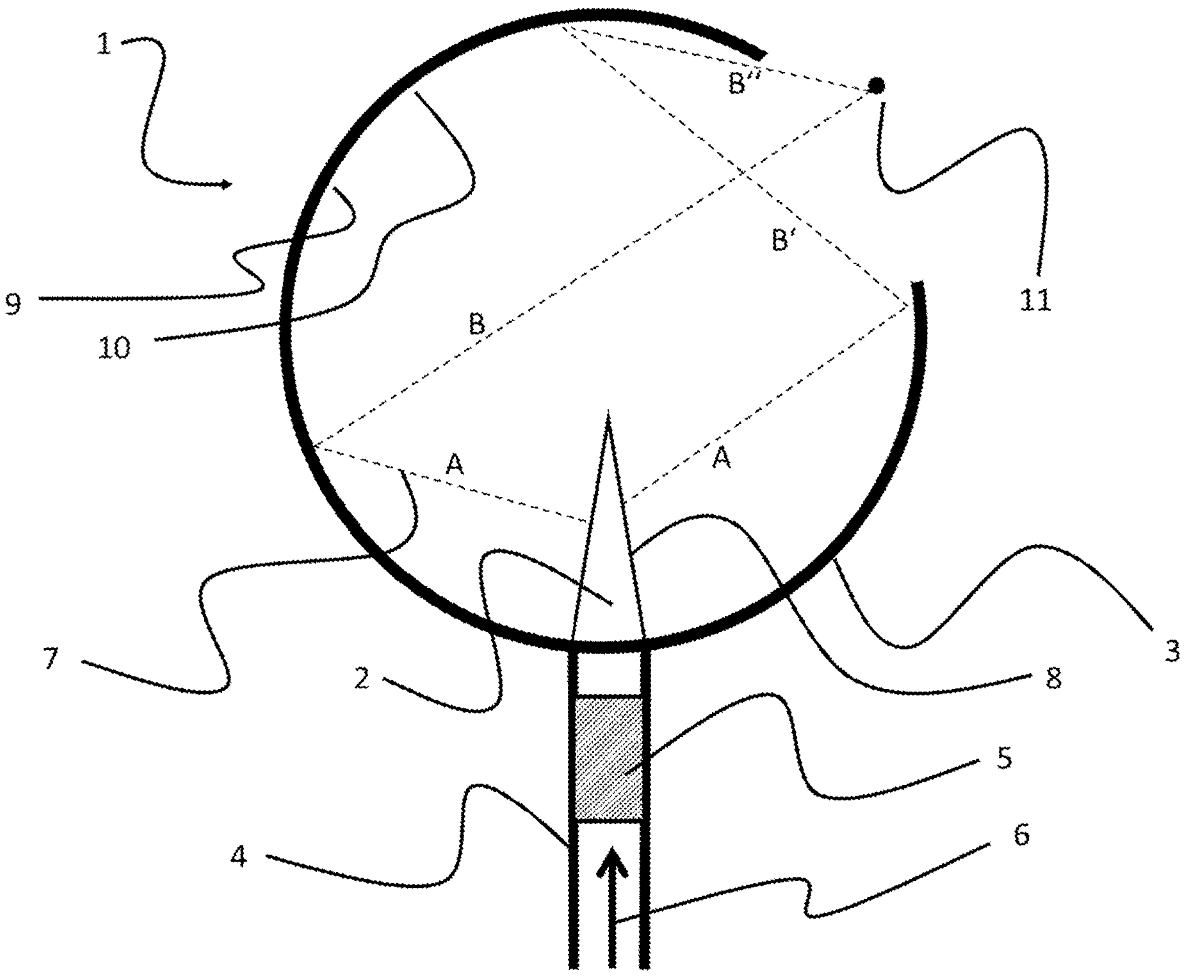
1
B''
11
B'
9
B
10
A
A
7
2
8
3
5
4
6

DEVICE AND METHOD FOR DEFLECTING AND FOCUSING SHOCK WAVES BY A REFLECTION SURFACES WITH A FOCAL POINT DIFFERENT THAN A PROJECTILE OF A THRUST DIRECTION OF AN APPLICATOR

CROSS REFERENCE TO RELATED APPLICATIONS

This application claims the priority of DE 102023111367.4 filed on 2023 May 3 and the priority of DE 102024109730.2 filed on 2024 Apr. 8; all applications are incorporated by reference herein in their entirety.

BACKGROUND

The invention is based on a device for deflecting and focusing shock waves according to the preamble of claim 1; a utilisation of a device for deflecting and focusing shock waves according to the preamble of claim 8; and a method of focusing and deflecting a shock wave according to the preamble of claim 10.

Chronic and painful soft tissue diseases of the human musculoskeletal system are very common and patients often suffer for months without any recognisable improvement, which is a burden not only for the patient but also for the healthcare system, since such diseases often involve lengthy treatment. Depending on whether the muscle and fasciae or the tendon insertions are affected, a distinction is made between myofascial pain syndromes and tendinopathies. These affect the muscles and their sheaths (fasciae) as well as the tendons at their points of attachment to the bones. The pain generally results from incorrect and excessive strain and is characterised by stiffness and shortening of the muscles and by local hardenings (myogeloses) that are often abnormally sensitive to pressure, forming what is generally referred to as "trigger points". Inflammatory processes may also play a role and may lead to calcification occurring in the bone attachment zones of the tendons. The pathophysiological mechanisms are highly complex and are not yet fully understood. Clinical pictures typically encountered include adhesive capsulitis and tendinosis calcarea of the shoulder, also referred to as "frozen shoulder", as well as plantar fasciitis of the foot, which, when accompanied by calcifications and bony protrusions of the heel, is known as heel spur. Extracorporeal shock wave therapy (ESWT) has proven to be a non-invasive treatment for these clinical pictures. Their effectiveness has been proven in controlled studies, for conditions such as, for example, frozen shoulder (Farr, S. et al., Knee Surgery, Sports Traumatology, Arthroscopy 2011, 19 12; Abo Al-Khair, M. A. et al., The Physician and Sportsmedi-cine 2021, 49, 4) and heel spur (Berbrayer, D. et al., PM&R 2014, 6 2; Pisani, E. et al., "Effectiveness and tolerability of focal versus radial extracorporeal shock wave." Beyond Rheumatology 2020, 03/2020) as well as for myofascial pain syndromes of the back (Gezginaslan, Ö. et al., Archives of Rheumatology 2020, 35, 1; Min Ji, H. et al., Annals of Rehabilitation Medicine 2012, 36, 5). Today, the treatment of heel spur is no longer considered an individual health service (IGe service) and the costs have been covered by the statutory health insurance bodies since January 2019. However, it is difficult to hit the exact treatment area, with the focal point measuring just a few millimetres. Owing to this problem, treatment is sometimes unsuccessful and the patient continues to suffer pain.

Objective, targeted treatment through pain monitoring does not yet exist. Various scientific studies have focused on the application of laser evoked potentials (LEP) in pain diagnostics (for an overview, see Treede, R. D. et al., Neurophysiologie Clinique/Clinical Neurophysiology 2003, 33, 6). Applications for musculoskeletal pain (Lorenz, J., Zeitschrift für Rheumatologie (Journal of Rheumatology) 1998, 57, 2, and Lorenz, J. Pain Forum 1998, 7, 212) and for the detection of inflammatory processes (Domnick, C. et al., Journal of pain research 2009, 2, 49) are of particular interest for the planned project.

Shock waves are high-energy waves which are capable of penetrating water and soft tissue. ESWT was originally introduced to remove kidney and gall stones without surgery, but for more than 20 years it has conquered a much broader field of application in medicine, especially orthopaedics. A major advantage of focused ESWT is that the energy flux density can be directed to deeper target tissue with millimetre precision, so that surrounding tissue is spared. On the other hand, when utilising a radial shock wave source, the energy flux density is maximised at the skin surface and then spreads radially into the deeper tissue layers. Focussing the shock waves is technically complex and uses electrohydraulic, electromagnetic and piezoelectric methods (Gerdesmeyer, L. M. et al., Der Orthopade 2002, 31, 7). In comparison, the generation of radial shock waves on the basis of a ballistic shock wave generation concept, as described for example in EP 4 039 202 B1, is less complex and therefore more cost-effective. This involves accelerating a projectile with the aid of compressed air. At the end of a short acceleration distance, the projectile is abruptly stopped on an impact surface. The impact surface is located on what is known as an applicator, which transfers the resulting shock wave to the patient's skin. To date, there are no devices available that can also generate fo-cussed shock waves by using the simple ballistic operating principle employed to generate radial shock waves.

There are currently three different methods of generating shock waves used in focused shock wave therapy. All generation variants are based on an electrical energy source (Ueberle, F. Einsatz von Stoßwellen in der Medizin. Medizintechnik: Verfahren-Systeme-Informationsverarbeitung (The Use of Shock Waves in Medicine. Medical technology: Procedures-Systems-Information Processing) 2017). The electrohydraulic principle involves applying a high voltage between two electrodes under water to generate a high-energy spark and focusing the resulting pressure wave at a second focal point via an elliptical reflector (Wess, O., Journal für Mineral-stoffwechsel (Journal of Mineral Metabolism) 2004, 11, 4). The electromagnetic principle involves generating shock waves through the magnetic field of a current-carrying coil and the deflection of a membrane—in a manner similar to that of a loudspeaker. The pressure signal is focused by a reflector or an acoustic lens (Crevenna, R. et al., Current Physical Medicine and Rehabilitation Reports 2021, 9). The piezoelectric principle uses the mechanical expansion of several spherically arranged piezo elements (achieved by applying a voltage) to generate the shock waves, which are focused by the spherical arrangement. Radial shock wave therapy has so far been based on the ballistic pressure pulse principle (Ueberle, F. Einsatz von Stoßwellen in der Medizin. Medizintechnik: Verfahren-Systeme-Informationsverarbeitung (The Use of Shock Waves in Medicine. Medical technology: Procedures-Systems-Information Processing) 2017). In contrast to the focused principles, the driving force behind the ballistic principle is compressed air. In a small metal tube measuring around 15 cm in length, a cylindrical projectile is accelerated by means of pneumatically generated compressed air and collides with an impactor located at the end of the tube. The collision creates a high pressure wave, which is transmitted to the patient's skin via the applicator and by using ultrasound gel. This pressure wave spreads radially from the application site into the tissue and gradually loses its energy with increasing penetration depth.

Current state-of-the-art technology offers various options for focusing waves. When focusing spherical waves, semi-ellipsoids of revolution are often used. The waves are created inside the ellipsoid and are reflected on its walls. The shape of the ellipsoid can be used to determine the distance at which the reflected waves overlap and thus form the focus (Rassweiler, J. et al., Extrakorporale Stoßwellen-therapie der Urolithiasis. (Extracorporeal Shock Save Therapy of Urolithiasis). SLK-Kliniken Heilbronn GmbH, Urology, Heilbronn, Germany). Another way of focusing waves is the use of acoustic lenses. This involves the use of both concave and convex lens shapes. As they pass through the lens, the waves are bent and meet at a focal point located behind the lens. Again, the focal point can be adjusted by selecting an appropriate lens shape and lens material. A somewhat newer method consists in focusing acoustic pressure waves through acoustic meta-materials (Löfken, J. O., Akustische Linse aus ungewöhnlichem Material. (Acoustic Lens Made of Unusual Material) 15 Sep. 2021., www.weltderphysik.de, retrieved: 25.03.2024). These consist of a symmetrical or specific arrangement of structures. Depending on the frequency of the wave and on the choice of material, the wave will be reflected and/or scattered in a different manner. If the frequency of the wave is close to the resonance frequency of the structured material, the sound wave will be scattered many times and the sum of the scattered waves results in a negative refraction index. The negative wave refraction then causes a focusing of the waves. To date, little research has been carried out in this area of focusing, but this method is expected to have great potential for a wide range of applications in both medicine and industry.

SUMMARY

A device (1) for deflecting and focusing shock waves, a utilisation of a device (1) for deflecting and focusing shock waves, and a method of focusing and deflecting a shock wave are proposed, wherein the device (1) comprises at least one applicator (2), with at least one applicator (2) having at least one application surface (8) and a shock wave being capable of being emitted from at least one application surface (8) in a thrust direction, and at least one reflector (3), with at least one reflector (3) having at least one reflection surface (9) and a focal point (11) on which shock waves may be focused by the reflection surfaces (9), with the focal point (11) not being located in a thrust direction, whereby the primary shock wave may, in particular, be prevented from impinging on the tissue to be treated.

DETAILED DESCRIPTION

It is therefore an object of the invention to provide a device for deflecting and focusing shock waves that overcomes the disadvantages of the state of the art, a utilisation of a device for deflecting and focusing shock waves that overcomes the disadvantages of the state of the art, and a method of focusing and deflecting a shock wave that overcomes the disadvantages of the state of the art.

The device for deflecting and focusing shock waves according to the invention including the features of claim 1, the utilisation of a device for deflecting and focusing shock waves according to the invention including the features of claim 8, and the method of focusing and deflecting a shock wave according to the invention including the features of claim 10 have the advantage over the known art that the device comprises at least one applicator, with at least one applicator having at least one application surface and at least one application surface being capable of emitting a shock wave in a thrust direction, and at least one reflector, with at least one reflector having at least one reflection surface and a focal point on which shock waves may be focused by the reflection surfaces, with the focal point not being located in a thrust direction, whereby the primary shock wave may, in particular, be prevented from impinging on the tissue to be treated. This makes it possible to adjust the wave intensity at the treatment site, thus avoiding unnecessary pain suffered by the patient and the occurrence of treatment-induced injuries, such as haematomas. The focal point is preferably located obliquely (approximately tangentially) with respect to the thrust direction of the applicator that faces towards a reflection surface. The application surface of the shock waves also points in the direction of the reflection surface. Due to the fact that the impact and the application surface point in the direction of the reflection surface, the major part of the shock wave is reflected and focused and only a minimal component penetrates into the surrounding medium in an unfocused manner. The reflection surface is used to deflect and focus the propagating shock waves in the direction of the focal point. It would be conceivable to employ multiple deflection, in particular double deflection, in order to further minimise the component of the shock wave that is emitted in an unfocused manner.

According to an advantageous configuration of the device of the invention, at least one applicator and at least one reflector are reversibly interconnected. This makes it possible, for example, to use different types of reflector. It would be conceivable that the reflectors distinguish themselves by different focal points and thus by different penetration depths, spot sizes, and the like. It would further be conceivable for the reflector to be indirectly connected to the applicator, for example via the housing of the device, or via a connection with a projectile barrel. In this respect, it would be conceivable for the connection to be realised by means of screws, as a clamping connection, a plug-in mechanism, a magnetic coupling, or by being slid onto a rail, or the like. It would be conceivable for the reflector to be mountable on a hand piece, together with the applicator, the acceleration tube for a projectile, and the ceramic projectile.

According to an additional advantageous configuration of the device of the invention, the at least one reflector is shaped in the form of a sphere. The at least one reflection surface of the reflector preferably starts at the level of the applicator and is closed around it, with an opening being formed in the direction of the focal point. It would be conceivable for the opening to be reduced by means of a shutter.

According to an additional advantageous configuration of the device of the invention, the at least one reflection surface of the at least one reflector is shaped in such a way that, at least for a part of the shock wave, or a shock wave component, a distance representing the sum of a distance component A and a distance component B is of equal length, with the distance component A comprising the distance between a point on the application surface from which this shock wave component is emitted and a point on the reflection surface by which it is subsequently reflected, and the distance component B comprising the distance between the point on the reflection surface by which this shock wave component is reflected and the focal point. In cases of multiple reflection, the distance component B may be further subdivided into several sub-components (B', B", . . . ). This has the advantage that the various shock wave components will preferably impinge on the focal point at the same time. Shock wave components are vector quantities that are composed by a force that may be subject to variation and by a linear direction of propagation. The creation of reflection surface is preferably carried out by using a three-dimensional design method. The points of the reflector are designed such that the minimum distance from the application surface to the reflection point and from there to the focal point is the same for every reflection point. As a result, all shock wave components will enter the focal point at the same time, which leads to positive interference. A reflection surface is created from the calculated reflection points. The reflector is created from said reflection surface.

According to an additional advantageous configuration of the device of the invention, said device has at least one projectile, with at least one projectile being made of a ceramic material and/or at least one applicator being made of a metal and/or an alloy. Apart from its high degree of hardness, the material of the applicator is preferably characterised by a low specific acoustic impedance, preferably as close as possible to that of human tissue. The low specific acoustic impedance makes it possible to transmit a large part of the shock wave from the material of the applicator into the human tissue, either directly or via a bridging material.

According to a pertinent advantageous configuration of the device of the invention, at least one applicator is made of a magnesium and/or aluminium alloy. Preferably, the alloy is a hard magnesium and/or aluminium alloy. Most preferably, it is an aluminium alloy with increased strength, such as an aluminium alloy in accordance with the AMS4331A standard of the American Society of Aeronautic Engineers (SAE).

The reflector may further be filled, or at least partially filled, with a transition material in order to increase the transmitted component of the shock wave, said transition material being situated, in terms of its specific acoustic impedance, between magnesium and the human tissue and thus increasing the component of the shock wave that is transmitted into the tissue.

According to an additional advantageous configuration of the inventive device, at least one applicator has a cone-shaped tip. Unlike with flat applicators, the major part of the shock wave is not emitted in a forward direction but in a slightly oblique manner. Due to the distribution of the shock wave over the at least one reflection surface, a large surface area having low shock wave intensity is formed in the region where the shock wave that has been reflected by the reflector enters the body, which then, due to the focusing, develops into a small surface area having high intensity at the focal point. The distribution of the shock wave brought about by using a cone-shaped applicator tip thus creates a particularly pronounced contrast in shock wave intensity between the focal point and the surface of the body. It would be conceivable that the applicator is manufactured by means of a computer-assisted design method.

The utilisation of a device for deflecting and focusing shock waves according to the invention has the advantage over prior art that when the shock waves created by the device according the invention are employed for a patient's pain therapy, the intensity of the shock waves at the focal point are detected by means of an electroencephalogram, which makes it possible to measure their individual effect.

According to a pertinent advantageous configuration of the utilisation of the invention, the intensity of the shock waves is adjusted in accordance with a signal encountered in the electroencephalogram. This could be done manually or automatically. The pneumatic and ballistic principle has a decisive advantage which consists in the possibility of evaluating the efficiency of focused extracorporeal shock wave therapy (fESWT) by means of neurophysiological pain monitoring. Preferably, brain-electrical reactions (somatosensory evoked potentials, SEPs) are triggered in the electroencephalogram (EEG) by pulsed fESWT stimuli and may be used as objective measurements of the sensitivity to pain in the target regions when dealing with myofascial pain syndromes. Electrohydraulic, electromagnetic or piezoelectrically generated shock waves, such as those previously used for focusing ESWT, are not suitable for being examined using an EEG because the electromagnetic interference fields generated at the applicator produce considerable artefacts. The method of the invention does not produce such artefacts since here a ballistic shock wave generation concept is employed. Some authors have already demonstrated the fundamental applicability of focused ultrasound for objectifying pain originating from subcutaneous tissue and from muscle and joint structures (Wright, A. et al., *Temporal summation of pain from skin, muscle and joint following nocic* 2002; Wright, A. et al., *Pain* 1993, 52, 2; from Ithel Davies, I. et al., *Pain* 1996, 67, 1; Legon, W. et al., *PloS one* 2012, 7, 12; Xu, L. et al., "*Measurement of Focused Ultrasound Neural Stimulation; Somatosensory Evoked Potential at Two Separate Skin Temperatures" IEEE International Ultrasonics Symposium* (*IUS*) 2018). However the ultrasound stimuli used in these examinations do not have the physical characteristics that are considered to be relevant for yielding a therapeutic effect. Focused high-energy ultrasound does not create a mechanical shock wave effect in the target tissue comparable to that produced by ESWT stimuli but has rather a combined, mechanic and thermal effect on the pain receptors, which is probably due to the dissipation of the mechanical energy. In addition, pulsed fESWT stimuli have a very steep rising edge of the mechanical impulse. A stimulus time profile of this type is an important prerequisite for ensuring optimum synchronisation for stimulus-cycled EEG averaging, so that somatosensory evoked potentials (SEPs) can be expected in the patient's EEG after about 20 to 40 stimulus repetitions, which should represent an objective correlate of pain sensitivity in the target region. It is thus possible, in the course of repeated sessions, to neurophysiologically document the extent of pain relief in an objective manner. Along with the neurophysiological reactions to the fESWT stimuli, the patient's subjective perceptions might also be assessed. For this purpose, both quantitative methods (intensity and pain ratings) and qualitative methods are employed, which differentiate between sensory and affective perceptions (pain perception scale, SES). Referring to the pain perception scale SES, as proposed by Geissner (1988), it was possible to demonstrate that the subjective perceptions of electrical stimuli of the fasciae, which are described as cutting, stinging and aching pain, may be distinguished from those caused by stimuli of the underlying muscles, which are described as dull, throbbing and pounding pain (Schilder et al., 2018). In the case of a tissue inflammation, an additional, burning sensation would have to be expected. It is thus possible, by varying the penetration depth of the fESWT stimuli, to differentiate between the psychophysical and neurophysiological responses to a stimulation of the epidermis, the fasciae, and the muscles in order to be able to better determine an optimally appropriate penetration depth and stimulus intensity for a given therapeutic purpose. In the case of acute inflammation of the fasciae, for example, any mechanical irritation of the latter should be largely avoided. The aim would rather be to stimulate the underlying musculature, which has been altered by adhesions and shortening, as selectively as possible by using focused ESWT. Neurophysiological pain monitoring for each individual patient therefore seems to be a promising approach for stimulating the site to be treated at an appropriate tissue penetration depth and with suitable intensity. During repeated sessions, this allows, in addition, to document the therapeutic success. To date, ESWT treatment has been based on subjective pain feedback from the patient to the attending physician for dosing the energy input into the affected target region.

The method of focusing and deflecting a shock wave according to the invention, with a shock wave that consists of individual shock wave components being created by acceleration of a projectile towards an applicator that has an application surface and being emitted from said application surface in a thrust direction, and with said shock wave being at least partially reflected by the reflection surface of a reflector and at least partially focused on a focal point, has the advantage over prior art that the focal point is not located in a direction of thrust, whereby only a minimal component of the primary shock wave penetrates into the tissue to be treated.

According to an advantageous configuration of the method of the invention, the thrust direction is approximately tangential to the focal point.

According to an additional advantageous configuration of the method of the invention, at least for a part of the shock wave components, a distance between a point on the application surface from which this shock wave component is emitted, a point on the reflection surface by which it is reflected, and the focal point is of equal length.

According to an additional advantageous configuration of the inventive method, a device as claimed in any one of claims 1 to 7 is used.

Further advantages and advantageous configurations of the invention may be found in the following description, in the claims and in the drawings.

BRIEF DESCRIPTION OF THE DRAWINGS

A preferred embodiment example of the object according to the invention is represented in the drawings and will be described hereunder in greater detail. In the drawing FIG. 1 is a schematic representation of a device according to the invention,

DETAILED DESCRIPTION OF THE PREFERRED EMBODIMENTS

FIG. 1 shows a schematic representation of a device 1 for deflecting and focusing shock waves according to the invention. The device comprises an applicator 2 and a reflector 3 which are connected with a projectile barrel 4 in such a manner that a projectile 5 accelerated in said projectile barrel 4 can be accelerated towards the applicator 2 in such a way that it collides with it. The collision with the applicator 2 takes place in the thrust direction 6 of the projectile 5 and causes shock waves which are composed of different shock wave components 7, with individual shock wave components 7 being emitted in their specific thrust directions from individual points of the application surfaces 8. The application surfaces 8 are directed towards reflection surfaces 9 and the respective shock wave components 7 impinge thereon in respective reflection points 10. At the reflection points 10, the shock wave component 7 is reflected and also deflected, unless the reflection is a total reflection. The specific, pre-calculated structure of the reflection surfaces 9 causes the shock wave components 7 to become focused on the focal point 11, wherein, due to the pre-calculation of the structure of the reflection surfaces 9, at least a part of the shock wave components 7 cover the same distance and this distance is made up of the distance components A and B or the sub-distance components B' and B" that belong to the specific shock wave component 7. The position of the focal point 11 will primarily depend on the structure of the reflection surfaces 9 of the reflector 3 and on the applicator 2. In the illustrated embodiment example, the reflector 3 is connected to the projectile barrel 4, with a connection between the two being also conceivable by means of an enveloping housing or the like. In the device 1 of the invention, the reflector 3 may be readily exchanged and replaced by another reflec-tor 3 having another focal point 11. In the context of the invention, the focal point 11 is not to be understood merely as a point with an ideally infinitesimally small area, but can also represent a focal area that makes it possible to treat a larger zone at a time. For better transmission of the shock waves, the reflector 3 can be filled with a transition material.

All of the characteristics represented in the description, as considered either in themselves or in any combination with each other, may be deemed essential to the invention.

LIST OF REFERENCE NUMERALS

1 device
2 applicator
3 reflector
4 projectile barrel
5 projectile
6 thrust direction of the projectile
7 shock wave component
8 application surface
9 reflection surface
10 reflection point
11 focal point

The invention claimed is:

1. A device (1) for deflecting and focusing shock waves, including at least one applicator (2), with the at least one applicator (2) having at least one application surface (8) and at least one application surface (8) being capable of emitting configured to emit a shock wave in a thrust direction of the at least one applicator, including at least one reflector (3), with at least one reflector (3) having at least one reflection surface (9) and a focal point (11) on which shock waves configured to be focused by the at least one reflection surface (9), including at least one projectile (5), which is configured to be accelerated in a projectile thrust direction (6) towards the at least one applicator (2), characterised in that the at least one reflection surface (9) of the at least one reflector (3) is shaped in such a way that, at least for a part of the shock wave, or a shock wave component (7), a distance representing the sum of a distance component A and a distance component B is of equal length, with the distance component A comprising the distance between a point on the application surface (8) from which the shock wave component is configured to be emitted and a point (10) on the reflection surface (9) by which is configured to be subsequently reflected, and the distance component B comprising the distance between the point (10) on the reflection surface (9) by which this shock wave component (7) is configured to be reflected and the focal point (11);

characterised in that the focal point (11) is not located in any of the thrust directions, neither that of the projectile thrust direction (6) or the thrust direction of the at least one applicator.

2. The device (1) as claimed in claim 1,
characterised in that
at least one reflector (3) is shaped in the form of a sphere.

3. The device (1) as claimed in claim 1,
characterised in that
at least one projectile (5) is made of a ceramic material or at least one applicator (2) is made of a metal and/or an alloy.

4. The device (1) as claimed in claim 3,
characterised in that
at least one applicator (2) is a made of a magnesium alloy and/or aluminium alloy.

5. The device (1) as claimed in claim 1,
characterised in that
at least one applicator (2) has a cone-shaped tip.

6. A utilisation of a device (1) for deflecting and focusing shock waves as claimed in claim 1,
wherein the shock waves are created for the purpose of a patient's pain therapy, characterised in that
a somatosensory evoked potential (SEP) at the focal point (11) is detected by means of an electroencephalogram.

7. The utilisation as claimed in claim 6,
characterised in that
the intensity of the shock waves is adjusted in accordance with a signal encountered in the electroencephalogram.

8. A method for focusing and deflecting a shock wave,
wherein a shock wave that consists of individual shock wave components (7) is configured to be created by acceleration of a projectile (5) towards an applicator (2) that has an application surface (8) and configured to be emitted from said application surface (8) in a thrust direction of the applicator, characterised in that the at least one reflection surface (9) of the at least one reflector (3) is shaped in such a way that, at least for a part of the shock wave, or a shock wave component (7), a distance representing the sum of a distance component A and a distance component B is of equal length, with the distance component A comprising the distance between a point on the application surface (8) from which this shock wave component is emitted and a point (10) on the reflection surface (9) by which is configured to be subsequently reflected, and the distance component B comprising the distance between the point (10) on the reflection surface (9) by which this shock wave component (7) is reflected and the focal point (11);

the shock wave is at least partially configured to be reflected by the reflection surface (9) of a reflector (3) and at least partially configured to be focused on a focal point (11), characterised in that the focal point (11) is not located in any thrust directions, neither that of a projectile thrust direction (6) or the thrust direction of the at least one applicator.

9. The method as claimed in claim 8,
characterised in that
the thrust direction is tangential to the focal point (11).

10. The method as claimed in claim 8,
characterised in that
at least for a part of the shock wave components (7), a distance between a point on the application surface (8) from which this shock wave component is emitted, a point (10) on the reflection surface (9) by which it is reflected, and the focal point (11) is of equal length.

11. The method as claimed in claim 8,
characterised in that
a device (1) as claimed in claim 1 is used.

* * * * *